(12) United States Patent
Abe et al.

(10) Patent No.: US 9,908,276 B2
(45) Date of Patent: Mar. 6, 2018

(54) FORMING DIFFERENT PLASTIC PRODUCTS FROM A SINGLE MELT

(71) Applicant: Univation Technologies, LLC, Houston, TX (US)

(72) Inventors: Daudi A. Abe, Angleton, TX (US); Simon J. White, Katy, TX (US)

(73) Assignee: Univation Technologies, LLC, Houston, TX (US)

(*) Notice: Subject to any disclaimer, the term of this patent is extended or adjusted under 35 U.S.C. 154(b) by 662 days.

(21) Appl. No.: 14/366,576

(22) PCT Filed: Nov. 28, 2012

(86) PCT No.: PCT/US2012/066730
§ 371 (c)(1),
(2) Date: Jun. 18, 2014

(87) PCT Pub. No.: WO2013/101377
PCT Pub. Date: Jul. 4, 2013

(65) Prior Publication Data
US 2015/0001755 A1 Jan. 1, 2015

Related U.S. Application Data

(60) Provisional application No. 61/582,313, filed on Dec. 31, 2011.

(51) Int. Cl.
*B29C 47/08* (2006.01)
*B29C 47/70* (2006.01)
(Continued)

(52) U.S. Cl.
CPC ............ *B29C 47/084* (2013.01); *B29B 7/748* (2013.01); *B29B 7/7485* (2013.01); *B29B 7/88* (2013.01);
(Continued)

(58) Field of Classification Search
CPC .......................... B29C 47/084; B29C 47/366
See application file for complete search history.

(56) References Cited

U.S. PATENT DOCUMENTS 3,261,056 A  7/1966 Fritsch
3,311,952 A * 4/1967 Kovach ................ B29C 47/864
                                                    425/190

(Continued)

FOREIGN PATENT DOCUMENTS

DE    102008058048 A1    8/2010
JP    S43-20779          9/1968
(Continued)

*Primary Examiner* — Benjamin A Schiffman
(74) *Attorney, Agent, or Firm* — Brooks, Cameron & Huebsch, PLLC

(57) ABSTRACT

Systems (200) and methods for making different plastic products (202, 204) in a single melting process are provided. A method includes melting a plastic resin in a first extruder (104) to form a melt (106) and transferring at least a portion of the melt to a second extruder (114). Any portion of the melt (106) that is not transferred to the second extruder (114) is formed into a first plastic product (202). Additives (116) are blended with the melt in the second extruder to form a second melt (118), and a second plastic product (204) is formed from the second melt (118).

13 Claims, 6 Drawing Sheets

(51) Int. Cl.

| | | |
|---|---|---|
| B29C 47/00 | (2006.01) | |
| B29C 47/10 | (2006.01) | |
| B29C 47/36 | (2006.01) | |
| B29C 47/50 | (2006.01) | |
| B29C 47/74 | (2006.01) | |
| B29B 7/74 | (2006.01) | |
| B29B 7/88 | (2006.01) | |
| B29B 9/06 | (2006.01) | |
| B29B 9/12 | (2006.01) | |
| B29C 47/04 | (2006.01) | |
| B29C 47/64 | (2006.01) | |
| B29C 47/92 | (2006.01) | |
| B29K 105/16 | (2006.01) | |
| B29B 7/46 | (2006.01) | |
| B29B 7/40 | (2006.01) | |
| B29B 7/82 | (2006.01) | |
| B29B 7/90 | (2006.01) | |
| B29K 101/12 | (2006.01) | |
| B29K 105/00 | (2006.01) | |
| B29L 23/00 | (2006.01) | |

(52) U.S. Cl.
CPC ............. *B29B 9/06* (2013.01); *B29B 9/065* (2013.01); *B29B 9/12* (2013.01); *B29C 47/0014* (2013.01); *B29C 47/0021* (2013.01); *B29C 47/0023* (2013.01); *B29C 47/0026* (2013.01); *B29C 47/043* (2013.01); *B29C 47/0838* (2013.01); *B29C 47/1063* (2013.01); *B29C 47/364* (2013.01); *B29C 47/366* (2013.01); *B29C 47/367* (2013.01); *B29C 47/50* (2013.01); *B29C 47/64* (2013.01); *B29C 47/70* (2013.01); *B29C 47/702* (2013.01); *B29C 47/745* (2013.01); *B29B 7/40* (2013.01); *B29B 7/46* (2013.01); *B29B 7/7466* (2013.01); *B29B 7/82* (2013.01); *B29B 7/885* (2013.01); *B29B 7/90* (2013.01); *B29C 47/109* (2013.01); *B29C 47/1027* (2013.01); *B29C 47/1045* (2013.01); *B29C 47/92* (2013.01); *B29C 2947/926* (2013.01); *B29K 2101/12* (2013.01); *B29K 2105/0005* (2013.01); *B29K 2105/16* (2013.01); *B29L 2023/22* (2013.01)

(56) References Cited

U.S. PATENT DOCUMENTS

| | | | |
|---|---|---|---|
| 3,860,220 | A | 1/1975 | Matsubayashi et al. |
| 4,182,601 | A | 1/1980 | Hill |
| 5,372,765 | A | 12/1994 | Chen et al. |
| 5,723,082 | A | 3/1998 | Mizuguchi et al. |
| 6,197,412 | B1 * | 3/2001 | Jambois ............ B29C 47/28 428/297.4 |
| 7,815,360 | B2 | 10/2010 | Munz et al. |
| 2008/0093763 | A1 | 4/2008 | Mancosh et al. |
| 2009/0057621 | A1 | 3/2009 | Keulen et al. |

FOREIGN PATENT DOCUMENTS

| | | |
|---|---|---|
| JP | 2005059370 | 3/2005 |
| WO | WO1999/08856 | 2/1999 |

* cited by examiner

500

FORMING DIFFERENT PLASTIC PRODUCTS FROM A SINGLE MELT

CROSS-REFERENCE TO RELATED APPLICATIONS

This application is a National Stage application under 35 U.S.C. § 371 of International Application No. PCT/US2012/066730, filed Nov. 28, 2012, that claims the benefit of Serial No. 61/582,313, filed Dec. 31, 2011, the disclosures of which are incorporated by reference in their entireties.

BACKGROUND

Making colored plastic products is often a three step process, with each step taking place at a different facility. In a first process, a plastic resin, such as polyethylene, polypropylene, polystyrene, or other resin, is synthesized and pelletized for sales at a production facility. In a second step, at another facility the pelletized resins are compounded with an additive, such as a colorant masterbatch, and formed into colored pellets. As used herein, a masterbatch is a material blended with a high concentration, e.g., as much as 70% or more, by weight, of a pigment or other additive. In a final process, the colored plastic pellets are formed into a final product, such as a pipe, sheet, film, bottle, and the like. In some circumstances, the colorant may be blended with the resin at the facility producing the plastic product.

Due to the risk of contamination, colorant is generally not used at the production facility and more generally is not used in large extruders that are used to produce uncolored products in addition to colored products. Thus, color compounding facilities have traditionally been entirely separate facilities with associated intermediate storage and handling facilities. Constructing and maintaining a separate compounding facility can be very expensive, and may often cost as much as $US20-30 million, or more. Thus, lower cost systems for forming colored products would be beneficial.

In some applications, sequential extruders have been used to provide different mixing environments to solve problems with mixing resins that have different characteristics. For example, a small side-feed extruder can be used to melt additives, such as masterbatches, for feeding to a larger blending extruder. In another example, a first extruder may provide an aggressive blending environment to melt a resin quickly. The melted resin may then be fed to a second extruder that provides a gentler environment for a longer period of time to blend in more sensitive resins. An application using this type of arrangement is a bimodal blending line, configured to blend a high molecular weight polyethylene with a low molecular weight polyethylene. For example, in U.S. Pat. No. 7,815,360 a material processing plant with two screw-type extruding machines is disclosed, wherein a first extruding machine discharges a melt through a linkage to a lower lying extruder. Other systems having multiple sequential or cascading extruders have been described, for example, in European Patent Application Publication No. 1 005 411 B1, U.S. Pat. No. 3,261,056, and German Patent Publication No. 2 304 088 A.

A number of systems have been developed that use a side extruder to melt a feed, or form a compound, and then force it into a main extruder for blending with a polymer system. For example, U.S. Patent Application Publication No. 2009/0057621 discloses electrically conductive compositions and methods for forming these compositions. In the method described, a molten masterbatch is mixed with a first polymer in a first extruder. The first polymer has a melt viscosity that is lower than the melt viscosity of the molten masterbatch, and the melt viscosity of the molten masterbatch is reduced to form a reduced viscosity molten masterbatch. The reduced viscosity molten masterbatch is mixed with a second polymer in a second extruder to form the electrically conductive composition.

U.S. Patent Publication No. 2008/0093763 discloses multi-color fiber-plastic composites and systems and methods for forming the composites. In the application, multiple compounding extruders are used to form melts that are forced into a primary extruder for blending with a base polymer.

In addition to these systems, any number of other systems can use side feed extruders to feed melted materials into a main extruder, including commercially available systems from Coperion GMBH, of Stuttgart, Germany, (under the ZS-B trade name), among others. However, all of the prior systems are configured to combine melted materials for blending and forming a single plastic product. Thus, the prior systems are configured to send all of the melt formed in a first extruder into a second extruder.

As described above, forming colored plastics is generally performed in a multistep process, with the resins pelletized and cooled between each step. Although this may lower or eliminate the risk of cross-contamination of a natural, or uncolored, resin with a color, it subjects the resin to multiple heat histories. The subsequent heat input steps also deplete the additives used to protect the plastic resin from UV, heat and other aggressive environments so that additional additives may be required in continuing process/fabrication steps. Furthermore, the costs of building separate intermediate storage and compounding facilities can substantially increase the costs of the colored resins and products.

Thus, there remains a need for improved processes for forming colored plastics. Furthermore, there is a need for a method that would enable one to form different plastic products from a single melt stream.

SUMMARY

Described herein are systems for forming different plastic products from a single melt. The system may include a main extruder system that includes an extruder configured to melt a plastic resin to form a melt and an additive system configured to feed an additive to the melt in the extruder. A first die is configured to form a first plastic product from the melt; and a diverter system that is configured to transfer at least a portion of the melt to a secondary product extruder system. The secondary product extruder system includes a second product extruder that is configured to blend the melt with a product additive to form a second product melt. An additive feeder is configured to feed the product additive to the second product extruder, and a second die is configured to form a second plastic product from the product melt.

Another embodiment provides a method for making two plastic products in a single melting process. The method includes melting a plastic resin in a first extruder to form a melt and transferring at least a portion of the melt to a second extruder, wherein any portion of the melt that is not transferred is formed into a first plastic product. Additives are blended with the melt in the second extruder to form a second melt, and a second plastic product is formed from the second melt.

Another embodiment provides a method for making a plurality of plastic products from a single melt. The method includes melting a resin in a main extruder to form the melt and blending additives with the melt. At least a portion of the melt is diverted to each of a number of product extruders. A plastic product is formed from the portion of the melt in the main extruder that is not diverted. A number of additives are blended with the melt in each of the product extruders, and other plastic products are formed from each of the product extruders.

DETAILED DESCRIPTION

Described herein are methods and systems for forming multiple plastic products from a single initial melt. For example, a primary extruder can be configured to melt a resin and blend in general additives, such as stabilizers, among others. A portion of the melt from the first extruder can be directed to one or more secondary extruders, while a remaining portion of the melt can be sent to a pelletizer, or other system, for forming a plastic product. In a secondary extruder, other additives, such as colorants, fillers, and the like, may be blended with the melt to form a product melt. The product melt may then be directed to a pelletizer, pultrusion pipe die, sheet die, or film die, among others, to form a second plastic product.

This configuration provides a number of advantages over the current systems. For example, the secondary extruders may have a much lower horsepower requirement, since the feed is already molten. The primary additive feed and feeder systems, used for the primary extruder, do not have to be duplicated. The total heat exposure, or heat history, of the polymer is substantially decreased, which will lower the amount of the stabilizers consumed, and may improve performance properties.

In addition to the beneficial effects on the resin, a number of logistical benefits can be achieved. For example, offline storage and handling of intermediate natural product at mixing facilities may be eliminated. The footprint of the facility, i.e., the space required for installation, may be 25% less than the installation of two extruders with pelletizers. As the secondary extruder is provided a molten feed under pressure, a melt pump may not be needed on the second extruder. Further, personnel and utility expenses may decrease.

Extrusion Systems

Figure 1:
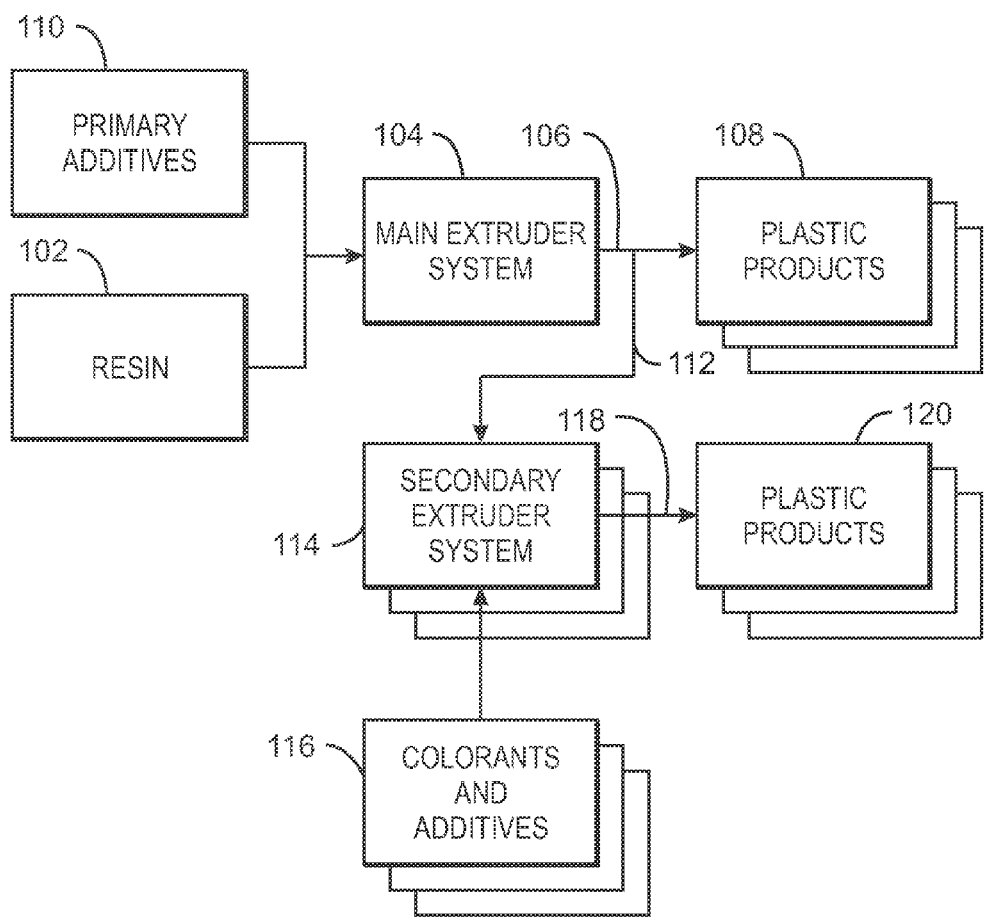
FIG. 1 is a block diagram of an extrusion system that can be used to form different plastic products from a single melt.

FIG. 1 is a block diagram of an extrusion system 100 that can be used to form different plastic products from a single melt. In the extrusion system 100, a resin 102 is fed to a main extruder system 104 for forming a softened plastic. As used herein, this softened plastic is termed a "melt" 106. The resin 102 may be in the form of pellets, spheres, solution, or in any other form. For example, the extrusion system 100 can be located at a plastics production facility, in which the main extruder system 104 is designed to process the resin into plastic products 108, such as pellets. As another example, the extrusion system 100 can be located in a plastics compounding plant, which is configured to produce a number of plastic products 108. The resin 102 can include polyethylene, polypropylene, styrenics, polycarbonates, polyacrylates, styrene-butadiene copolymers, or any number of other materials. For example, in one embodiment, the resin 102 is a high density polyethylene resin used for pipe, bags, and other applications.

The main extruder system 104 can include any number of melt processing extruders and devolatilization extruders of any design, including, for example, twin screw extruders marketed by Coperion GMBH, of Stuttgart, Germany, under the ZSK trade name and twin rotor mixers marketed by KOBELCO, Kobe Steel Ltd of Tokyo, Japan under the LCM trade name. Other extruders that can be used in the present techniques are marketed by David-Standard, LLC, of Pawcatuck, Conn., USA, and KraussMaffei Berstorff GMBH of Hannover, Germany. It can be noted that these are merely exemplary, as any number of single screw or twin screw extruders from other suppliers may be used.

Primary additives 110 can be added to the main extruder system 104 for compounding into the melt 106. The primary additives 110 may be added by solid feeders, liquid feeders, or melt extrusion pumps, which use an extruder screw that may, in some cases, melt the additive and force it into the main extruder system 104. The primary additives 110 may include primary stabilizers, secondary stabilizers, and the like, as well as any number of additives that may be used in a natural or uncolored product. Any number of other additives may be used as the primary additives 110, such as light stabilizers, crosslinking agents, and the like. However, in some embodiments, the primary additives 110 do not include colorants, so as not to contaminate the plastic products 108 formed from the melt 106 coming from the main extruder system 104.

A portion 112 of the melt 106 formed in the main extruder system 104 may be fed to one, or more, secondary extruder systems 114, which may also be termed product extruder systems herein. In the secondary extruder system 114, colorants and additives 116 may be blended with the portion 112 of the melt 106 to form additional melt streams 118. The colorants and additives 116 may include colorants, fillers, or other additives that may contaminate later batches of the plastic product 108 if added to the main extruder system 104, in some situations, all of the melt 106 may be used to form the additional melt streams 118 and, therefore, none of the plastic products 108 are made.

In one embodiment, the colorants and additives 116 include a black colorant formed into a masterbatch, for example, by blending carbon black with a resin. The masterbatch may be fed into the secondary extruder system 114 through a pellet feeder. In some embodiments, a melt feeder may be used to add the masterbatch, for example, using a single screw extruder to melt the masterbatch and force it into the secondary extruder system 114. In other embodiments, the colorants and additives 116 can include other types of colorants, such as liquid colorants added with a liquid feed system. The colorants and additives 116 are not limited to colorants, and may include any number of other materials, such as light stabilizers, fillers, reinforcing materials, other resins used for blending, and the like.

The portion 112 of the melt 106 and the colorants and additives 116 are combined in the secondary extruder system 114 to form a product melt 118. The product melt 118 can then be used to form additional plastic products 120. These plastic products 120 can include, for example, pellets, pipe, sheet, film, or any number of other products. Examples of extruder systems that may be used in embodiments are discussed further with respect to FIGS. 2-5.

Figure 2:
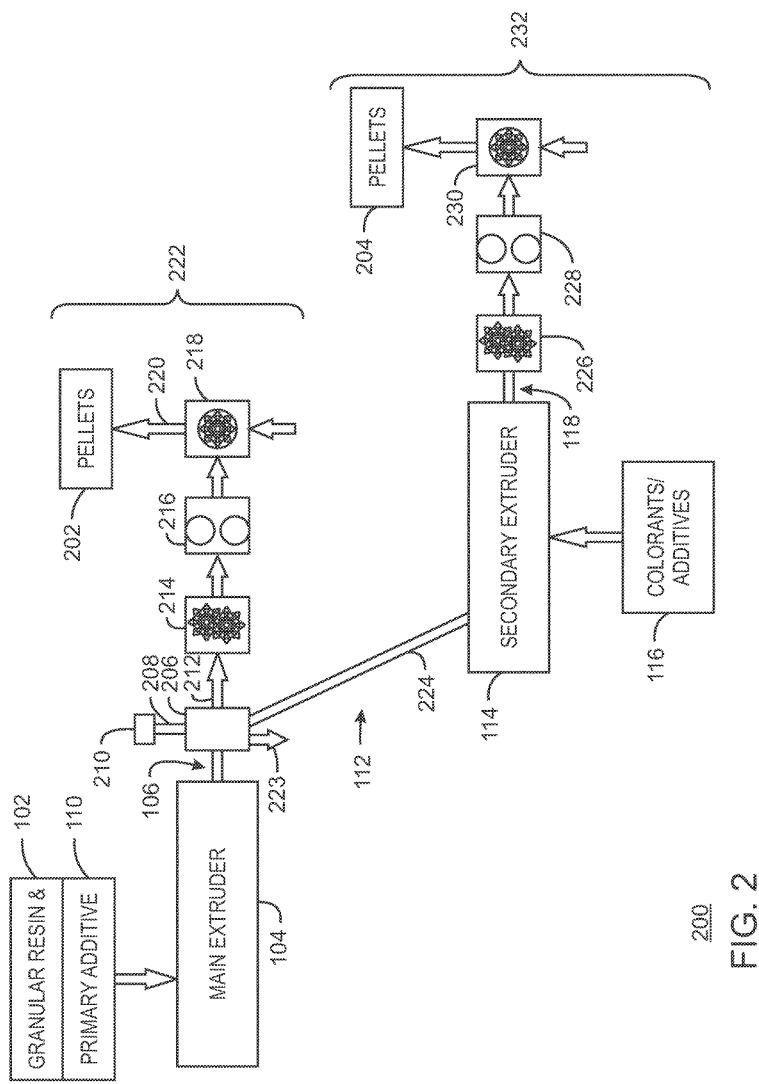
FIG. 2 is a schematic diagram of a two extruder system that can be used to form two different pelletized plastic products from a single melt.

FIG. 2 is a schematic diagram of a two extruder system 200 that can be used to form two different pelletized plastic products, e.g., pellets 202 and 204, from a single melt 106. Like numbered items are as described with respect to FIG. 1. After the primary additives 110 are blended with the resin 102 in the main extruder 104, the melt 106 is fed to a diverter valve 206. The diverter valve 206 may control three flow paths for the melt 106, which can be controlled by a piston 208 that is moved by an actuator 210. A first flow path 212 directs the melt 106 to a melt pump 214, which forces the melt 106 through a screen pack 216. The screen pack 216 can be used to remove solid contaminants, as well as gelled or cross-linked resin, from the melt 106. From the screen pack 216, the melt 106 can be fed to a pelletizer, such as an underwater pelletizer 218. The pellets 202 can then be isolated from the water stream 220 from the underwater pelletizer 218. The equipment used to process the melt 106 from the main extruder 104 is not limited to the configuration shown. It can be understood that any number of other configurations and equipment types can be used in the techniques disclosed herein.

The production line starting with the main extruder 104 and forming the pellets 202 can be referred to as the main line 222. The main line 222 may be a 100% natural line, e.g., producing a resin that has only the general additives with no colorants or other fillers. A second position of the diverter valve 206 can discharge a portion 112 of the melt 106 to the secondary extruder 114, for example, through an insulated and heated line 224.

Colorants and additives 116 may be fed to the secondary extruder 114, for example, as described with respect to FIG. 1. The melt 112 blended with the colorants and additives 116 forms the product melt 118. From the secondary extruder 114, the product melt 118 can be fed to a melt pump 226. Since the secondary extruder 114 is not required to melt the resin, the pressures from the secondary extruder 114 may be sufficient to force the product melt 118 through the downstream equipment without using a melt pump 226. For the same reason, the power demand for the secondary extruder 114 may be lower than the main extruder 104 for an equivalent production rate. A screen pack 228 may be used to remove solid contaminants and gels. The product melt 118 can then be sent to a die, such as a pelletizer 230, to form the final plastic product, pellets 204. The secondary extruder 114 and its associated equipment forms a second product line 232 that can form another plastic product at the same time as the main line 222, without risking contamination of the main line 222.

The ratio of the sizes of the main line 222 and the second line 232 are determined by the mix of products that may be desired. For example, the main line 222 can be rated for 100% capacity with a 50% turndown, e.g., the main line 222 can be operated as low as 50% of the maximum speed. In some embodiments, the second line 232 may be rated at the same rate, if all products from the main line 222 are to be made as a colored product of choice.

The second line 232 may be designed to produce at a rate that is less than 100% of the main line 222 depending on the desired product slate of natural versus colored pellets. For example, the second line 232 may be rated to 50% of the total rate. In this embodiment, whatever portion of the main line 222 that exceeds 50% total capacity may be formed into a plastic product in the main line 222, for example, as pellets 202. In other embodiments, the secondary extruder 114 may be rated at other proportions to the main extruder, such as 100% or less, or 75% or less, or 50% or less, or 25% or less, of the capacity of the main line 222. With this system the colorant or additives 116 added to the secondary extruder 114 cannot contaminate the pellets 202 formed from the main extruder 104.

The diverter valve 206 is not limited to two positions. In a third position, at least a portion of the melt 106 may be dumped as a waste stream 223. This position may be used during the start up of the main extruder 104, the secondary extruder 114, or both. In other embodiments, stream 223 may lead to a third extruder line.

Figure 3:
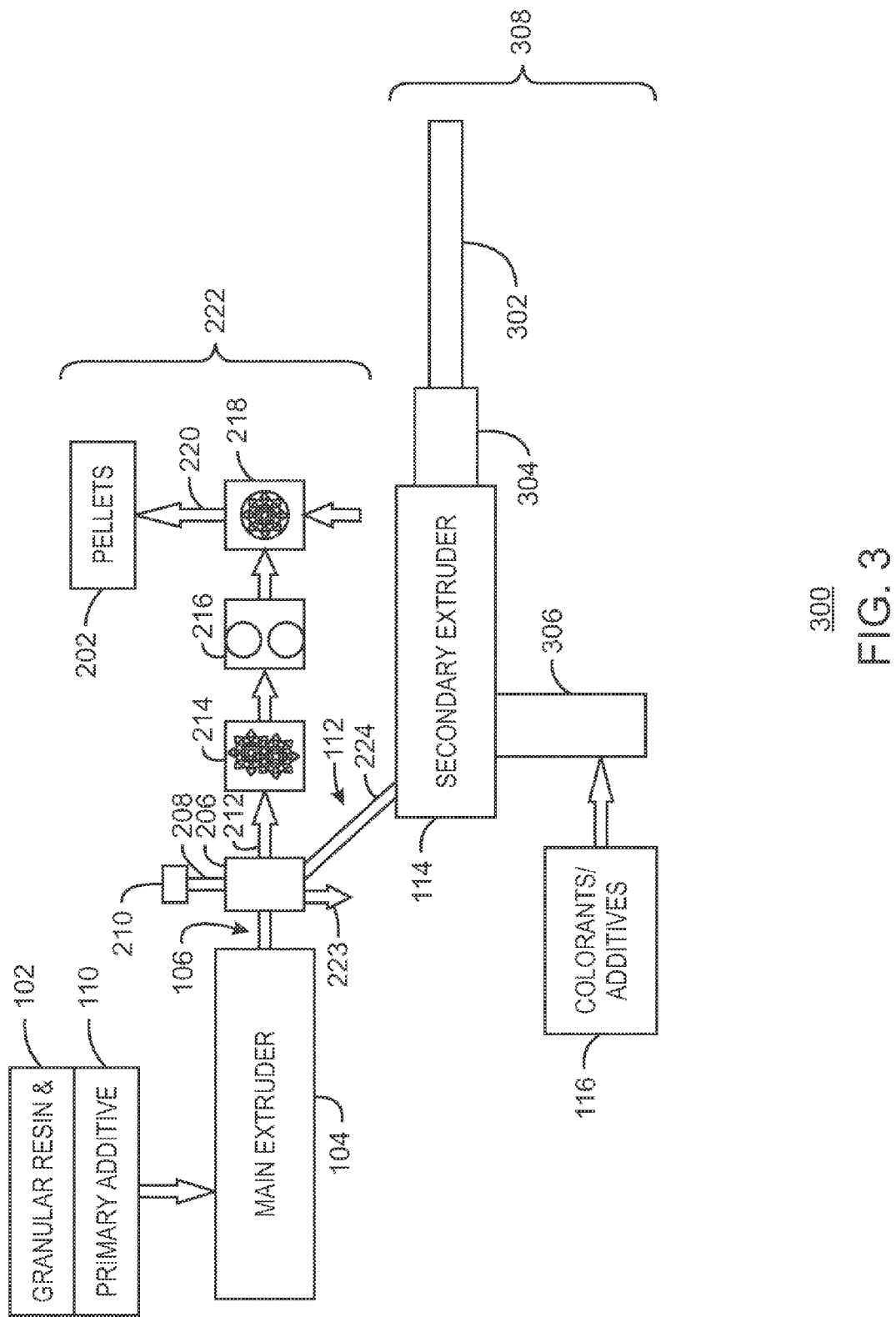
FIG. 3 is a schematic diagram of a two extruder system than can be used to form a pelletized plastic product and a pipe product from a single melt.

FIG. 3 is a schematic diagram of a two extruder system 300 that can be used to form a pelletized plastic product 202 and a pipe product 302 from a single melt 106. Like numbered items are as described with respect to FIGS. 1 and 2. The techniques and systems shown herein are not limited to forming two pelletized plastic products. In the example shown in FIG. 3, the product melt from the secondary extruder 114 is forced through a pipe die 304, such as a pultrusion pipe die, to form the pipe product 302. In this example, a melt feeder 306 is used to add the colorant and additives 116 to the secondary extruder 114. Thus, the main line 222 can be used to form pellets 202, for example, as natural resin, while the pipe line 308 may simultaneously be used to form a pipe product 302.

Figure 4:
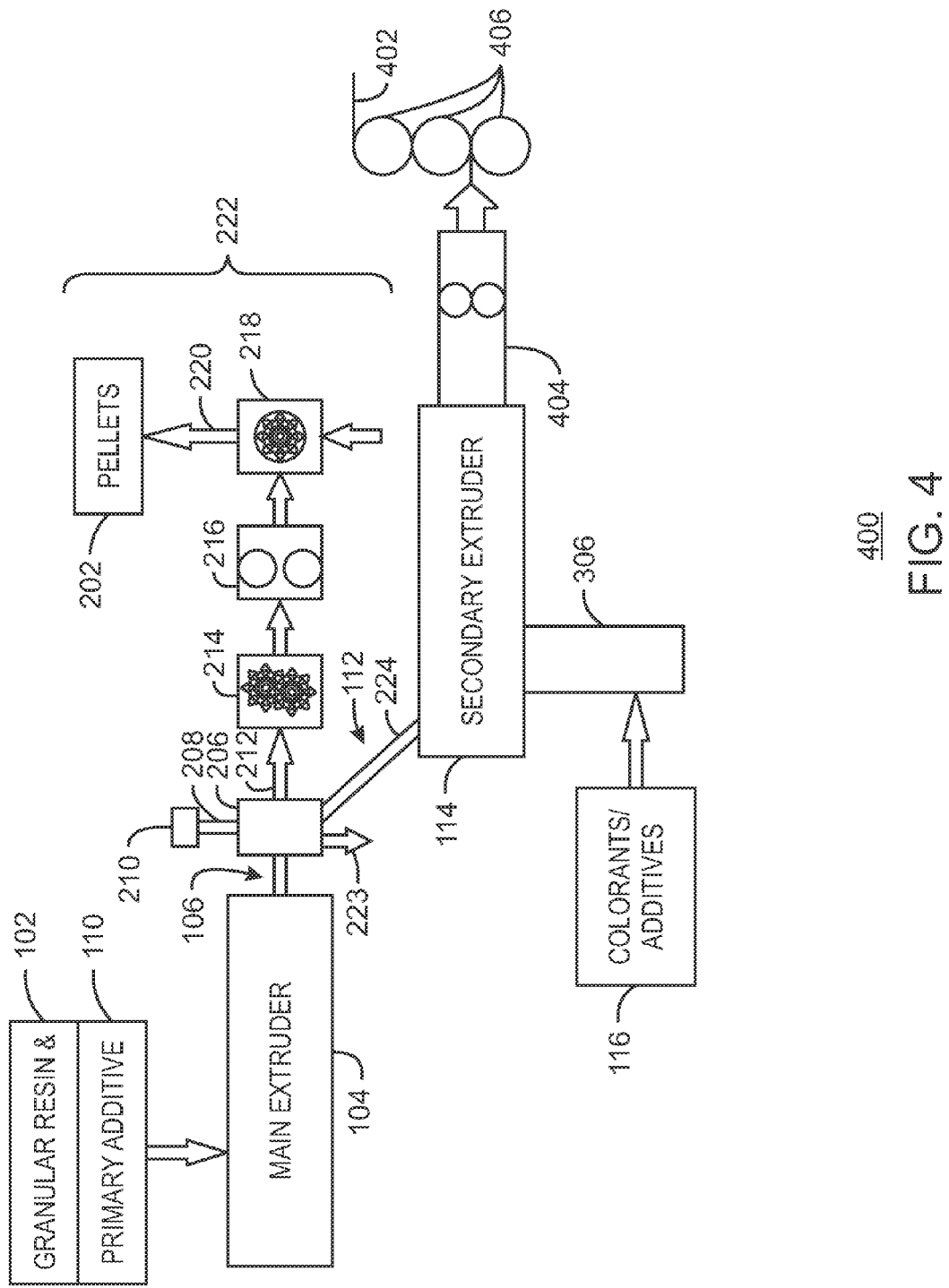
FIG. 4 is a schematic diagram of a two extruder system than can be used to form a pelletized plastic product and a sheet or film product from a single melt.

FIG. 4 is a schematic diagram of a two extruder system 400 that can be used to form pellets 202 and a sheet or film product 402 from a single melt 106. Like numbered items are as described with respect to FIGS. 1-3. In this example, the product melt from the secondary extruder 114 is forced through a sheet or film die 404 and extruded into a roll stack 406 to provide the sheet or film product 402. Any number of other dies can be used to provide different plastic products from the secondary extruder 114. Further, the main line 222 is not limited to pellets 202, but may be used to produce other products, depending on the product mix desired. The systems are not limited to two lines, but may be used with any number of secondary extruders 114, as discussed with respect to FIG. 5.

Figure 5:
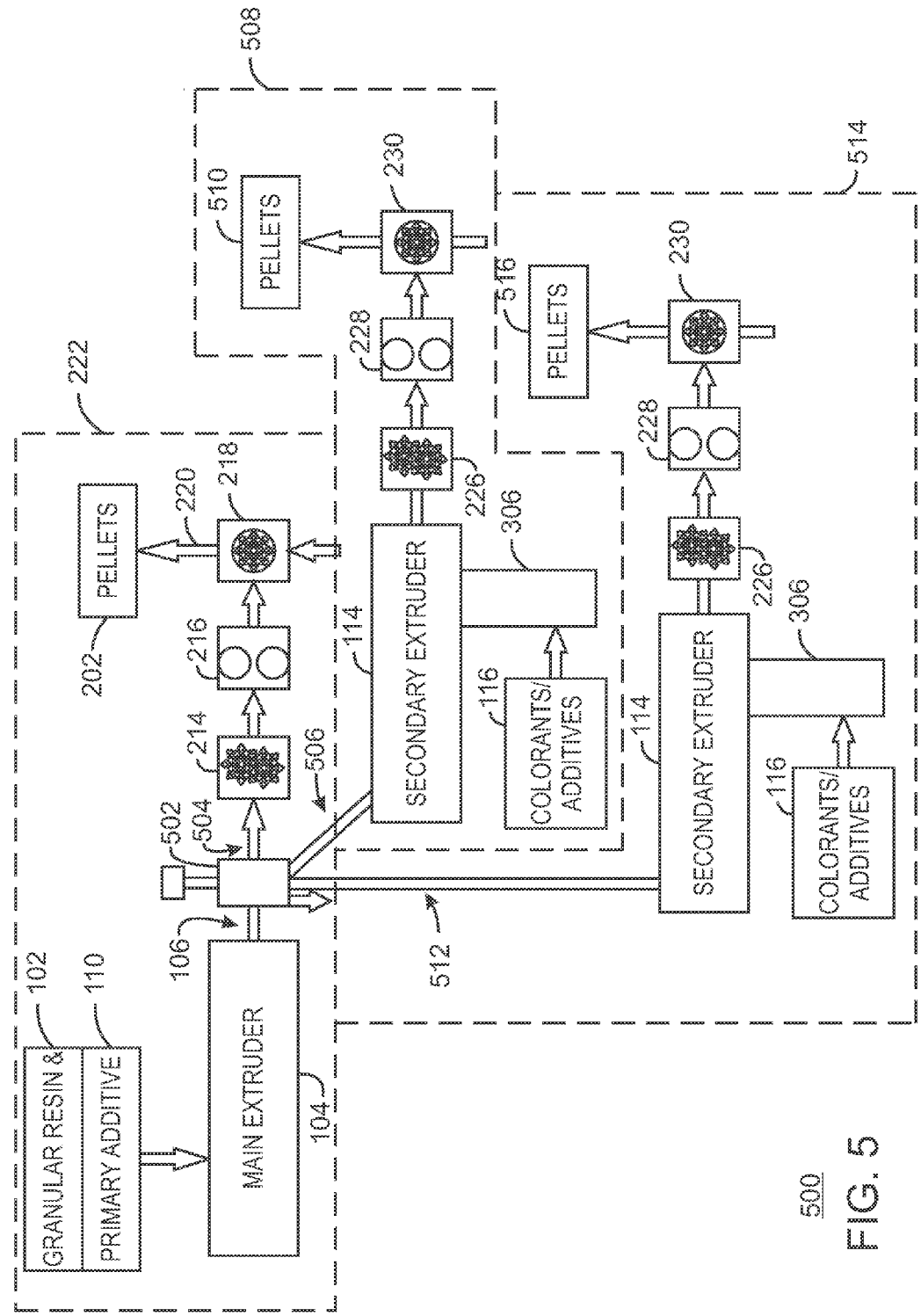
FIG. 5 is a schematic diagram of a three extruder system that can be used to generate three plastic products from a single melt.

FIG. 5 is a schematic diagram of an extruder system 500 that can be used to generate three plastic products from a single melt 106. Like numbered items are as described with respect to the previous FIGS. 1-4. In the extruder system 500, the diverter valve 502 in the main line 222 is configured to divide the melt 106 into three portions. A first portion 504 can be used to feed the equipment of the main line 222, forming the pellets 202. A second portion 506 can be used to feed a secondary extruder 114 in a second line 508, forming a second pelletized product 510. A third portion 512 can be used to feed another secondary extruder 114 in a third line 514, forming a third pelletized product 516. As the colorants and additives 116 used in the second line 508 may differ from the colorants and additives used in the third line 514, different pelletized plastic products, e.g., pellets 202, 510, and 516, can be formed from the melt 106. Further, it can be noted that the secondary extruders 114 can differ in construction, capacity, additive systems, dies, or any other features.

The extruder system 500 is not limited to three lines 222, 508, and 514, but may use any number of lines that can be effectively fed from melt 106 from the main extruder 104. Further, the lines 222, 508 and 514 are not limited to producing pellets, but may be used to produce any number of other plastic products, such as pipe, sheet, films, and the like, as discussed with respect to FIGS. 3 and 4. Thus, the techniques described herein may be used to provide an integrated plastics production facility, where a main extruder 104 is used to process granular resin 102, or other resin forms, produced in a reactor system to form a melt 106 containing basic additives, then provide portions of the melt to other extrusion lines that are configured to make other products, such as colored pellets, for sale.

Method for Forming Plastic Products

Figure 6:
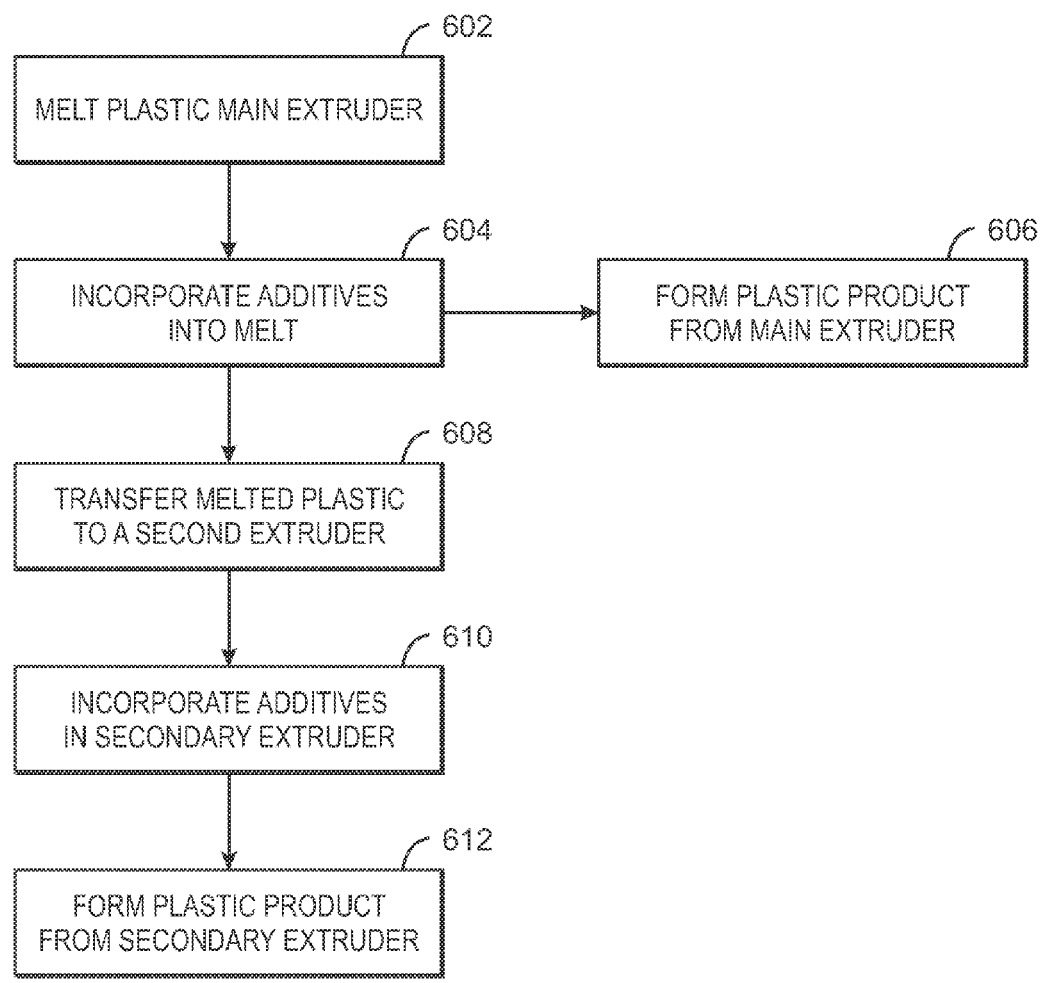
FIG. 6 is a process flow diagram of a method for generating more than one plastic product from a single melt.

FIG. 6 is a process flow diagram of a method 600 for generating more than one plastic product from a single melt. The method can be implemented using any of the configurations described herein, or any number of other configurations in which a first extruder can feed a portion of melt to a second extruder while retaining the capability to produce a plastic product with another portion of the melt.

The method 600 begins at block 602 with the melting of the plastic in the main extruder. As noted, this may be resin produced in a granular form from a reactor system. Further, the resin may be a solution that is being devolatilized in the main extruder. Additives are incorporated into the melt, as indicated at block 604. These additives may be the basic additives used in a natural plastic, such as stabilizers and crosslinking agents, among others. At block 606, a plastic product may be formed from the plastic melt formed in the main extruder.

At block 608, a portion of the melt is transferred to a secondary extruder. At block 610, additional additives, such as colorants, fillers, and the like, are incorporated into the melt in the secondary extruder. At block 612, plastic products are formed from the melt in the secondary extruder. As noted, such products may include pellets, pipe, sheet, film, or any number of other products.

DEFINITIONS

As used herein, an "extruder" is a device for forming a plastic melt and blending additives with the plastic melt. Extruders can have a single screw or twin screws placed in a barrel that has minimal clearance between the screws and the inner surface of the barrel. Each screw has a spiral ridge, or flights, that form openings between the barrel and the screw. The depth of the flights may be controlled to change the shear and stress applied to the resin, with shallower flights creating a higher stress environment. As the shaft of the screw is turned by a motor, the plastic is sheared in the flights, creating friction that melts or heats the plastic and forces it down the barrel. The flights of the screws in twin screw extruders are usually intermeshed, wherein each screw is fully wiped by the other screw, creating a more effective blending environment, and effectively pumping the melt down the barrel. The plastic is forced out an opening at the end of the barrel into downstream equipment, such as melt pumps, pelletizers, and dies, among others. The extruders may be standard extruders, configured to form a plastic melt from a solid plastic resin, or may be devolatilizing extruders, configured to remove solvent from a plastic in a solution, forming a plastic melt. Embodiments described herein are not limited to extruders, but may also use polymer mixers. A polymer mixer is a system using counter rotating non-intermeshed blending elements to impart shear to a resin, forming the melt and blending in additives.

As used herein, "additive systems" are devices and supporting equipment configured to feed materials into an extruder for blending. The additive systems can include pellet feeders configured to add solid pellets to a plastic melt in an extruder. Other types of additive systems can use single screw extruders configured to melt the additive and force the additive melt into the extruder for blending with the plastic melt. Another type of additive feeder can use a pump to force a liquid additive into the extruder. The screws of the extruder may have lower pressure zones to facilitate the addition of the additives, for example, by increasing the depth of the flights at the points of addition.

As used herein, a "die" is a shaped opening placed at the end of a plastics extrusion line to extrude the plastic into a particular shape. In a basic configuration, a pelletizer die in an underwater pelletizer is configured to extrude the plastic as narrow strands. A rotating knife placed against the face of the die cuts the strands into small roughly round pellets, which are carried away from the die face by a water flow. Another exemplary die is used to form a plastic pipe. In this die, a central piece, or mandrel, creates an annulus for the plastic flow. The extruded plastic is removed from the vicinity of the die and cooled, often by water contact, to harden the pipe. Other types of dies that can be used in embodiments include sheet and film dies, in which the plastic is extruded onto cooled rolls as a wide flat sheet, and blown film dies, in which the plastic is extruded out an annulus around a trapped air bubble.

As used herein, an "additive" is a material added to a plastic to impart beneficial properties or decrease the amount of plastic used. Additives may include primary stabilizers, secondary stabilizers, colorants, crosslinking agents, chain scission agents, fillers, reinforcing materials, and many other materials. Stabilizers are chemical compounds added to plastic melts to inhibit auto-oxidation reactions, making the plastics more resistant to heat damage during processing and increasing the lifespan in applications. A primary stabilizer reacts with an initial radical species formed to trap the radical, breaking the reaction chain. Hindered phenols are often used as primary stabilizers. Secondary stabilizers are stabilizers added in concert with a primary stabilizer to further improve the resistance to auto-oxidation. Secondary stabilizers general function by decomposing peroxides, which can be formed during oxidation reactions. Trivalent phosphorous compounds are often used as secondary stabilizers.

In certain applications, it may be favorable to change the molecular weight of the resin. A chain scission additive may be added to lower the total molecular weight of the resin, or a crosslinking agent may be added to increase the total molecular weight of the resin.

Colorants are additives that are used to impart a specific color to a plastic, which may be from a mineral or organic dye. Colorants are often made into masterbatches, in which as much as 70% of a dye is compounded with a plastic that is related to the final target plastic. Thus, a masterbatch for adding a color to a polyethylene plastic will usually be made using a polyethylene base resin.

While the present techniques may be susceptible to various modifications and alternative forms, the exemplary embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A system for forming different plastic products from a single melt, comprising:

a main extruder system, comprising:
- a main extruder configured to melt a plastic resin, forming a melt;
- an additive system configured to feed an additive to the melt in the main extruder;
- a first die positioned downstream from the main extruder
- a second product extruder system comprising a second product extruder that is located downstream of the main extruder;
- a diverter valve positioned downstream from the main extruder and between the main extruder and the first die and the second product extruder, the diverter valve configured to:
  - receive the melt from the main extruder;
  - transfer a first portion of the melt to the first die to form a first plastic product and
  - transfer a second portion of the melt to the second product extruder;

and the second product extruder system, comprising:
- the second product extruder configured to blend the second portion of the melt with an additive, forming a second product melt;
- an additive feeder configured to feed the product additive to the second product extruder; and
- a second die configured to form a second plastic product from the second product melt; wherein the second product extruder has a capacity that is about 75% or less than the capacity of the main extruder.

2. The system of claim 1, wherein the diverter valve is configured to transfer additional portions of the melt to each of a plurality of product extruders.

3. The system of claim 1, wherein the second product extruder has a capacity that is about 50% or less than the capacity of the main extruder.

4. The system of claim 1, wherein the second product extruder has a lower power demand than the main extruder for an equivalent amount of material.

5. The system of claim 1, wherein the main extruder system further comprises a melt pump.

6. The system of claim 1, wherein the second product extruder system does not comprise a melt pump.

7. The system of claim 1, wherein the first or second die comprises a pultrusion pipe die.

8. The system of claim 1, wherein the first or second die comprises a sheet die, a film die, or a combination sheet/film die.

9. The system of claim 1, wherein the first or second die comprises a blown film die.

10. The system of claim 1, wherein the additive feeder comprises a liquid injection system.

11. The system of claim 1, wherein the additive feeder comprises a melt pump feeder.

12. The system of claim 1, comprising a third product extruder system comprising:
- a third product extruder that is located downstream of the diverter valve and configured to blend a third portion of the melt with a product additive, forming a third product melt;
- an additive feeder configured to feed the product additive to the third product extruder; and
- a third die configured to form a third plastic product from the third product melt.

13. The system of claim 1, wherein the diverter valve is coupled to a piston and an actuator to control a flow rate of the first portion of the melt from the diverter value and to control a flow rate of the second portion of the melt from the diverter valve.

* * * * *